Oct. 27, 1959 F. H. BUSSMANN 2,910,562

PROTECTORS FOR ELECTRIC CIRCUITS

Filed April 29, 1955 5 Sheets-Sheet 1

INVENTOR.
FRANK H. BUSSMANN
BY
Rey Eilers
ATTORNEY

Oct. 27, 1959 F. H. BUSSMANN 2,910,562
PROTECTORS FOR ELECTRIC CIRCUITS
Filed April 29, 1955 5 Sheets-Sheet 2

INVENTOR.
FRANK H. BUSSMANN
BY
Roy Eilers
ATTORNEY

Oct. 27, 1959 F. H. BUSSMANN 2,910,562

PROTECTORS FOR ELECTRIC CIRCUITS

Filed April 29, 1955 5 Sheets-Sheet 3

INVENTOR.
FRANK H. BUSSMANN
BY
Roy Eibers
ATTORNEY

INVENTOR.
FRANK H. BUSSMANN
BY
Roy Eilers
ATTORNEY

Oct. 27, 1959 F. H. BUSSMANN 2,910,562

PROTECTORS FOR ELECTRIC CIRCUITS

Filed April 29, 1955 5 Sheets-Sheet 5

INVENTOR.
FRANK H. BUSSMANN
BY
Roy Eilers
ATTORNEY

United States Patent Office 2,910,562 Patented Oct. 27, 1959

2,910,562

PROTECTORS FOR ELECTRIC CIRCUITS

Frank H. Bussmann, Clayton, Mo., assignor to McGraw-Edison Company, a corporation of Delaware Application April 29, 1955, Serial No. 504,884

24 Claims. (Cl. 200—119)

Figures 1, 2, 3, 3A, 3B:
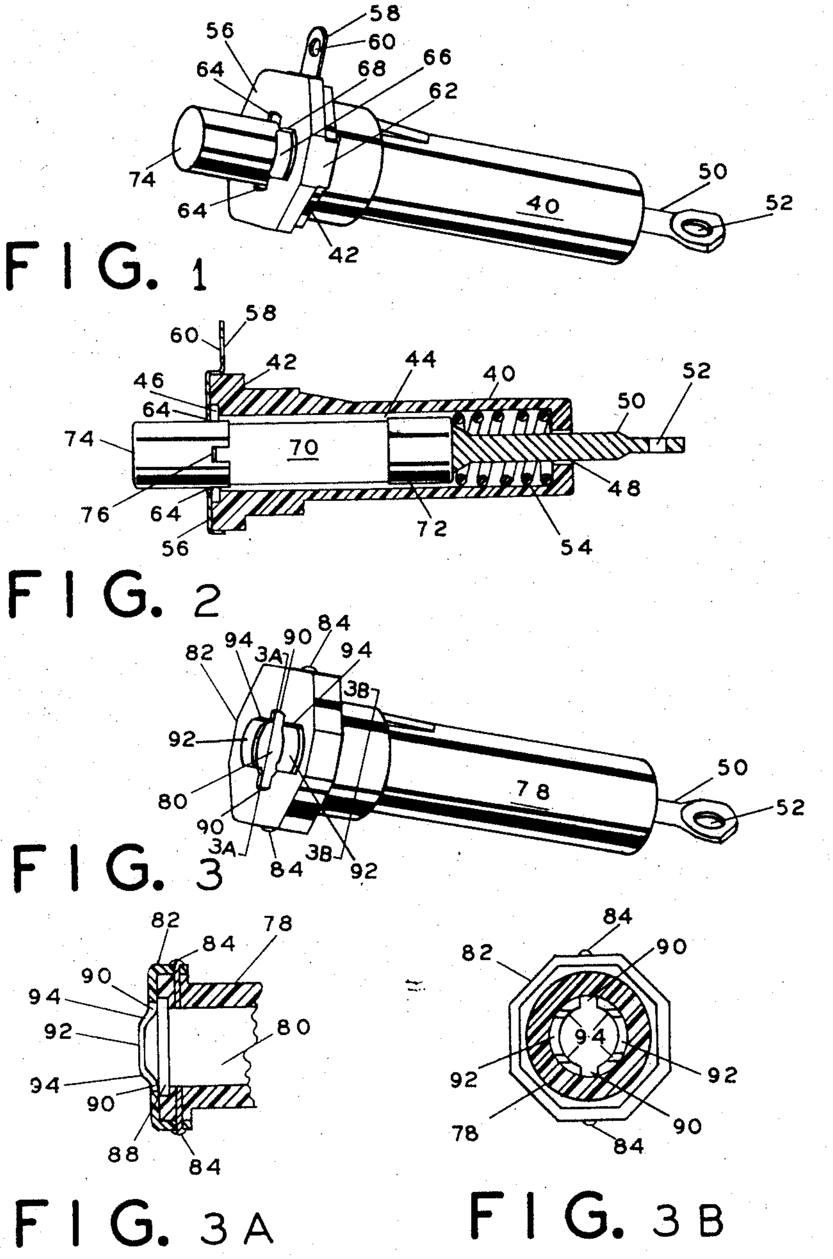

This invention relates to improvements in protectors for electric circuits. More particularly, this invention relates to improvements in protectors for electric circuits and in holders therefor.

It is therefore an object of the present invention to provide an improved protector for electric circuits and an improved holder therefor.

Protectors for electric circuits, that respond to overloads to open those circuits, can be made in different forms and shapes. Thus, electric fuses and similar overload-responsive protectors for electric circuits are customarily made in two standard, well-recognized forms and shapes, namely, plugs and cartridges. Electric fuses, and other overload-responsive protectors for electric circuits, of the cartridge type have elongated casings with electrically-conducting terminals at the opposite ends of those casings; and those terminals are selectively held by fuse clips or by the terminals of fuse holders. The fuse clips and the terminals of the fuse holders have, throughout the years, become more or less standardized. Consequently, it is frequently possible to successively insert protectors for electric circuits, that are made to have different ratings, in the same fuse clips or in the same fuse holder. Under certain circumstances this is desirable; but under other circumstances it is objectionable.

For example, where a circuit can safely carry only a predetermined amount of current, it would be undesirable to connect into that circuit a protector for electric circuits that had a rating which exceeded that predetermined amount of current. Hence it would be very advantageous to equip that circuit with a holder, for protectors for electric circuits, that would not accept protectors for electric circuits with ratings that exceeded that predetermined amount of current. Such a holder is particularly important where the persons who must install and replace those protectors for electric circuits are not familiar with the problems inherent in overloaded circuits.

In an effort to prevent the use of protectors for electric circuits that have ratings exceeding the ratings of those circuits, some manufacturers of plug-type protectors for electric circuits have equipped those protectors for electric circuits with rating-regulating surfaces. Those rating-regulating surfaces coact with complementary rating-regulating surfaces on the holders for those protectors for electric circuits to prevent the insertion of over-rated protectors for electric circuits in those holders. Specifically, plug-type protectors, for electric circuits, of the same rating can be equipped with screw threads of a pitch and lead that are distinctively different from the pitch and lead of the screw threads of plug-type protectors for electric circuits that have higher ratings; and holders for the first said plug-type protectors for electric circuits can be equipped with screw threads that will mate with the screw threads of the first said plug-type protectors for electric circuits but will reject the screw threads of the said other plug-type protectors for electric circuits. The screw threads of the first said plug-type protectors for electric circuits and the screw threads of the holders for those protectors for electric circuits thus regulate the ratings of the protectors, for electric circuits, that can be used with the circuits including those holders; and hence, those screw threads constitute rating-regulating surfaces.

Many different kinds of rating-regulating surfaces have been proposed for plug-type protectors for electric circuits, and one of them has met with wide-spread acceptance. It would be very advantageous to have cartridge-type protectors for electric circuits, and the holders therefor, equipped with rating-regulating surfaces; but to date no truly acceptable rating-regulating surfaces have been developed to prevent the insertion in circuits of a certain rating, of cartridge-type protectors for electric circuits that have a greater rating. The present invention provides such rating-regulating surfaces and thereby protects even the most unskilled persons from the problems that can arise from the insertion, in an electric circuit, of a protector for electric circuits which has a rating that exceeds the rating of that circuit. It is therefore an object of the present invention to provide rating-regulating surfaces that prevent the insertion in a circuit of a predetermined rating of protectors for electric circuits which have greater ratings.

The rating-regulating surfaces provided by the present invention are formed on the protectors for electric circuits and on the holders for those protectors. Those surfaces interact to permit any of a number of protectors having ratings within a predetermined range to be interchanged, but interact to keep protectors with greater ratings from being inserted in those holders. The rating-regulating surfaces have a positive and definite mechanical action; and thus they provide positive protection against the over-fusing of circuits. It is therefore an object of the present invention to provide protectors for electric circuits with surfaces that interact with complementary surfaces on the holders for those protectors to provide a positive and definite mechanical action that provides positive protection against the over-fusing of circuits.

The interacting, rating-regulating surfaces provided by the present invention preferably comprise projections on the protectors for electric circuits and notched elements on the holders for those protectors. The projections can be of predetermined size and configuration, and the notched elements will have notches of complementary size and configuration. Those projections and notches will conform closely to each other and will therefore be able to assure the rejection of other protectors for electric circuits which have projections of larger size or different configuration. By establishing a definite relationship between the ratings of the protectors and the size and configuration of the projections on those protectors, the present invention prevents the use, in circuits having a predetermined rating, of protectors having a greater rating. It is therefore an object of the present invention to provide projections on protectors for electric circuits and complementary notched elements on the holders for those protectors that will prevent the use, in circuits having a predetermined rating, of protectors having a greater rating.

In one preferred form of the present invention the projections are on the terminals of the protectors for electric circuits and the notched elements constitute terminals of the holders for those protectors. Such an arrangement is economical of parts and makes it simple to manufacture the protectors and the holders therefor. It is therefore an object of the present invention to provide a protector for electric circuits which has a projection on one of the terminals thereof and a holder therefor which has a notched terminal to receive the projection on that protector.

The rating-regulating projections on the protectors for electric circuits coact with the notched elements on the holders for those protectors to lock those protectors in current-conducting position within those holders. Ordinary cartridge-type protectors for electric circuits will not have those projections, and thus they will be unable to retain themselves within the holders for the first said protectors for electric circuits. This is very desirable because those ordinary protectors for electric circuits might have ratings in excess of the rating of the circuit of which the holder for the protector for electric circuits is a part.

The protectors for electric circuits, provided by the present invention, will preferably have the projections thereon formed in such a way that those protectors can also fit in ordinary fuse clips. Such an arrangement makes those protectors for electric circuits quite versatile since they can be used in rating-regulating holders for electric circuits and can also be used in ordinary fuse clips. Such an arrangement is also desirable because it enables manufacturers to equip a goodly number of their cartridge-type protectors with rating-regulating projections, and yet not restrict the use of those protectors to rating-regulating holders. It is therefore an object of the present invention to equip protectors for electric circuits with projections that permit those protectors to be mounted in ordinary fuse clips.

The interacting, rating-regulating surfaces provided by the present invention can be used with holders, for protectors for electric circuits, that have two terminals fixedly mounted on those holders. Those interacting, rating-regulating surfaces can also be used with holders, for protectors for electric circuits, that have just one terminal fixedly mounted on those holders and that have another terminal in the form of a harness cap. This arrangement enables the present invention to be applied to holders intended for use in widely differing installations.

The rating-regulating projection provided by the present invention is preferably located between the longitudinal center of the protector, for electric circuits, and one end of that protector. Such an arrangement is desirable because it makes it possible to prevent the telescoping of that end of the protector fully into the holder for the protector. That projection can be made so it will strike the body of the holder and positively prevent full telescoping action of the protector into the holder. It is therefore an object of the present invention to mount the projection of a protector, for electric circuits, intermediate the longitudinal center and one end of that protector.

The mounting of the projection intermediate the center and one end of the protector for electric circuits is additionally desirable because it makes it possible for that rating-regulating projection and the notched element in the holder to be in direct view of the user. If the rating-regulating surfaces were adjacent the innermost end of the recess in the holder that received the protector for electric circuits, those surfaces would be out of the view of the user, and the user would have to depend solely on his "sense of feel" to determine whether or not the rating-regulating surfaces are complementary in size and configuration. This is objectionable since many persons have an inadequate "sense of feel"; and those persons might apply excessive presures to the rating-regulating surfaces in their efforts to make them mate. The application of such pressures is unlikely where the rating-regulating surfaces are in full view of the user. It is therefore an object of the present invention to dispose the rating-regulating surfaces of the protector and the holder therefor in view of the user.

The rating-regulating surface of the holder provided by the present invention is preferably formed on an annular element that is pre-fromed and then fixedly secured to the body of the holder. Where this is done, a standard size and shape can be established for the body of the holder, and a number of individually-different, pre-formed annular elements can be variously associated with the body of the holder to provide the required individually different holders. Such an arrangement minimizes die and tool costs and also minimizes the stocking of different styles and types of holder bodies.

The rating-regulating surface on the holder is preferably equipped with a means to resist accidental rotation of the protector for electric circuits relative to the holder. Where this is done, the user can be assured of a positive locking between the protector for electric circuits and the terminal or terminals of the holder. Furthermore, that positive locking can be maintained despite considerable vibration. It is therefore an object of the present invention to provide the interacting surface of the holder for a protector for electric circuits with a means to resist accidental rotation of that protector relative to that holder.

Other and further objects and advantages of the present invention should become apparent from an examination of the drawing and accompanying description.

In the drawing and accompanying description several preferred embodiments of the present invention are shown and described but it is to be understood that the drawing and accompanying description are for the purpose of illustration only and do not limit the invention and that the invention will be defined by the appended claims.

Figure 4:
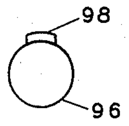
Figure 5:
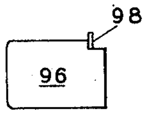
Figure 6:
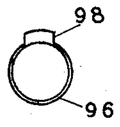
Figure 7:
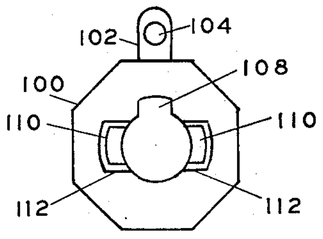
Figure 8:
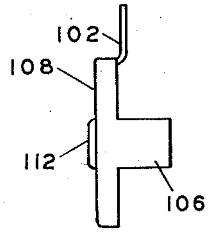
Figure 9:
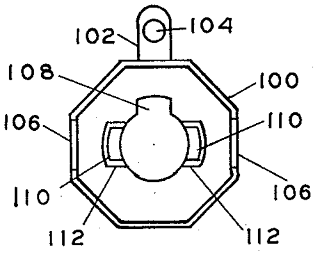
Figure 10:
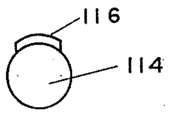
Figure 11:
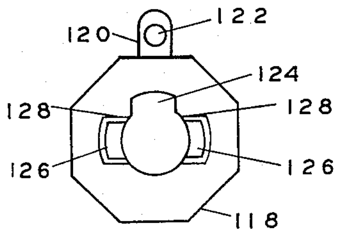
Figure 12:
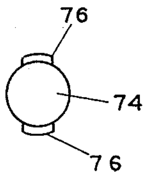
Figure 13:
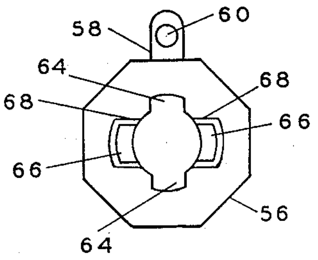
Figure 14:
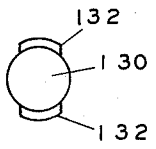
Figure 15:
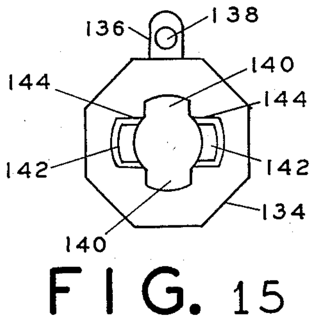
Figure 16:
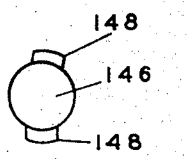
Figure 17:
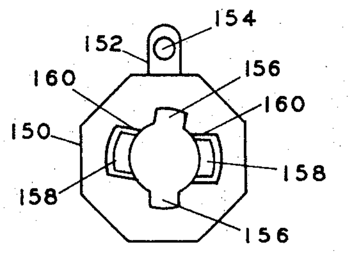
Figure 18:
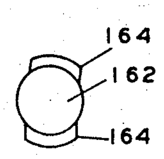
Figure 19:
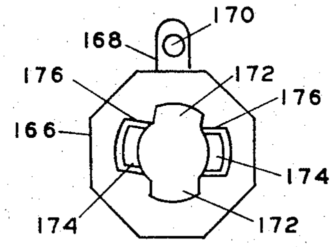
Figure 20:
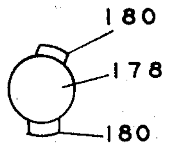
Figure 21:
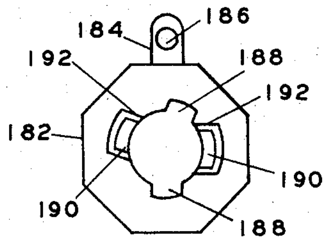
Figure 22:
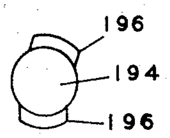
Figure 23:
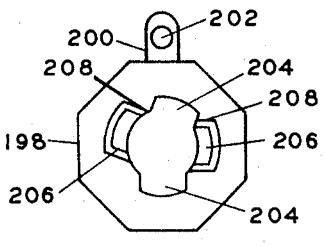
Figure 24:
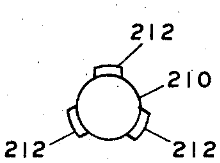
Figure 25:
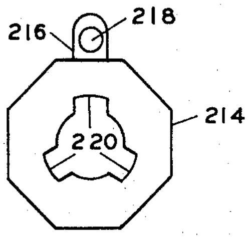
Figure 26:
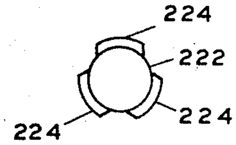
Figure 27:
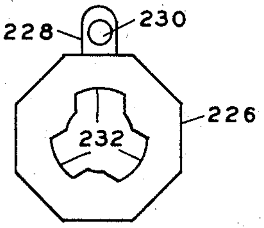
Figure 28:
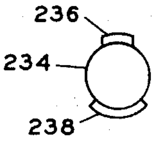
Figure 28A:
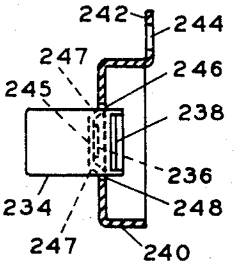
Figure 29:
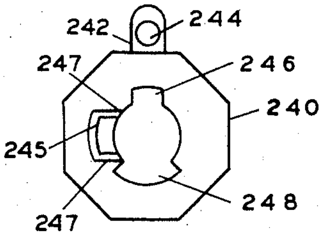
Figure 30:
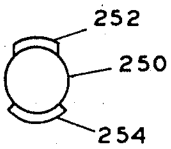
Figure 31:
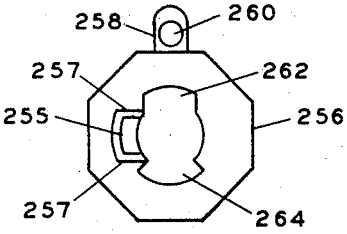
Figures 32, 33, 34, 35, 36:
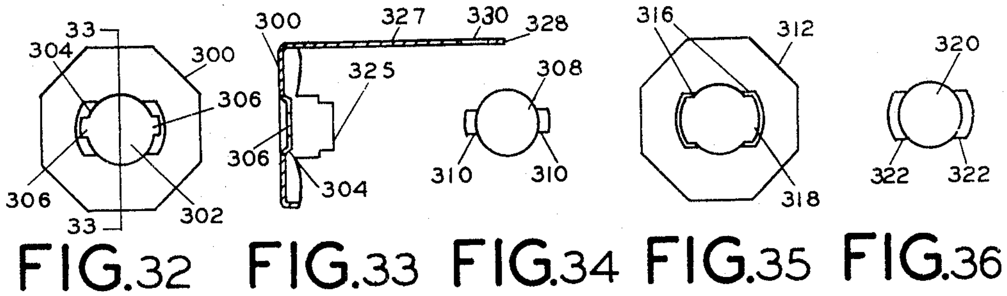
Figure 37:
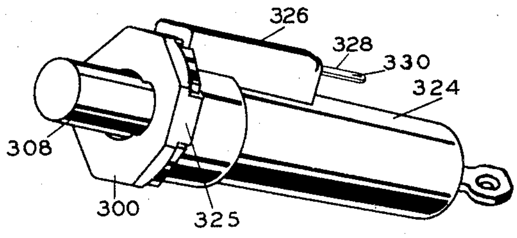
Figure 41:
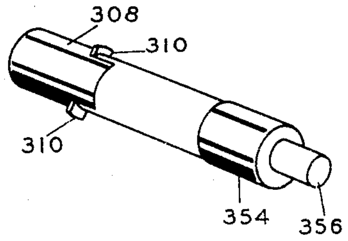
Figure 38:
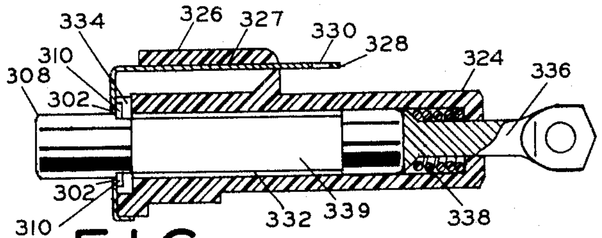
Figure 42:
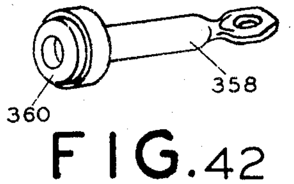
Figure 39:
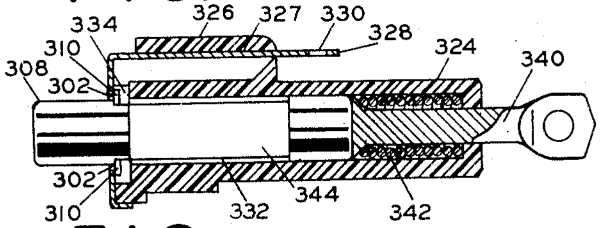
Figure 43:
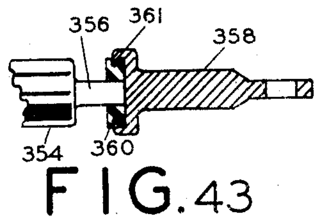
Figure 44:
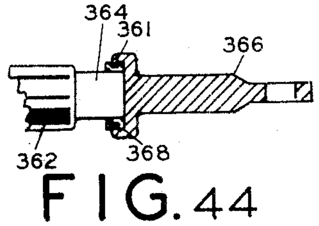
Figure 40:
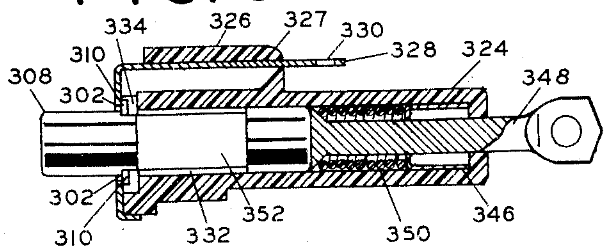

In the drawing:

Fig. 1 is a perspective view of a protector for electric circuits and a holder for that protector which are made in accordance with the principles and teachings of the present invention, Fig. 2 is a sectional view of the holder of Fig. 1, Fig. 3 is a perspective view of another form of holder for protectors for electric circuits that is made in accordance with the principles and teachings of the present invention, Fig. 3A is a sectional view of a portion of the holder of Fig. 3, and it is taken along the plane indicated by the line 3A—3A in Fig. 3, Fig. 3B is a sectional view of the holder of Figs. 3 and 3A, and it is taken along the plane indicated by the line 3B—3B in Fig. 3, Fig. 4 is an end view of a terminal for a cartridge-type protector for electric circuits, Fig. 5 is a side elevational view of the terminal of Fig. 4, Fig. 6 is another end view of the terminal of Figs. 4 and 5 and it shows the inner end of that terminal, Fig. 7 is an end view of a notched element that is a part of holders for protectors for electric circuits provided by the present invention, Fig. 8 is a side view of the notched element of Fig. 7, Fig. 9 is another end view of the notched element of Figs. 7 and 8 and it shows the inner end of that notched element, Fig. 10 is an end view of another terminal for protectors for electric circuits, Fig. 11 is another end view of another notched element for holders for protectors for electric circuits, Fig. 12 is an end view of one of the terminals of the protector for electric circuits shown in Figs. 1 and 2, Fig. 13 is an end view of the notched element of the holder of Figs. 1 and 2, Fig. 14 is an end view of still another terminal for a protector for electric circuits, Fig. 15 is an end view of still another notched element for a holder for protectors for electric circuits, Fig. 16 is a view of the outer end of a terminal for protectors for electric circuits which has angularly spaced projections thereon, Fig. 17 is an end view of a notched element to receive the terminal of Fig. 16, Fig. 18 is an end view of a terminal that is generally similar to the terminal of Fig. 16 but which has larger projections, Fig. 19 is an end view of a notched element that receives the terminal of Fig. 18, Fig. 20 is an end view of a terminal with spaced projections which are angularly spaced a distance different from the angular spacing of the projections on the terminals of Figs. 16 and 18, Fig. 21 is an end view of a notched element that can receive the terminal of Fig. 20, Fig. 22 is an end view of a terminal that is similar to the terminal of Fig. 20, but that has larger projections, Fig. 23 is an end view of a notched element that receives the terminal of Fig. 22, Fig. 24 is an end view of a terminal for protectors for electric circuits which has three projections thereon, Fig. 25 is an end view of a notched element which receives the terminal of Fig. 24, Fig. 26 is an end view of a terminal which is similar to the terminal of Fig. 24 but which has larger projections, Fig. 27 is an end view of a notched element that receives the terminal of Fig. 26, Fig. 28 is an end view of a terminal which has projections of differing size, Fig. 28A is a sectional view of the terminal of Fig. 28 assembled with the notched element of Fig. 29, Fig. 29 is an end view of the notched element that receives the terminal of Fig. 28, Fig. 30 is an end view of a terminal that is generally similar to the terminal of Fig. 28, Fig. 31 is an end view of a notched element that receives the terminal of Fig. 30, Fig. 32 is an end view of another notched element that is a part of a holder for protectors for electric circuits provided by the present invention, and it shows the outer face of that notched element, Fig. 33 is a sectional view of the notched element of Fig. 32, and it is taken along the plane indicated by the line 33—33 in Fig. 32, Fig. 34 is an end view of a terminal that is usable with the notched element of Fig. 32, and it shows the outer end of that terminal, Fig. 35 is an end view of a notched element which is similar to the notched element of Fig. 32 but which has larger notches, and it shows the outer face of that notched element, Fig. 36 is an end view of a terminal that is similar to the terminal of Fig. 34 but that has larger projections, and it shows the outer end of that terminal, Fig. 37 is a perspective of another holder, for protectors for electric circuits, that is made in accordance with the principles and teachings of the present invention, Fig. 38 is a longitudinal sectional view of the holder of Fig. 37, Fig. 39 is a longitudinal sectional view of another holder that is closely similar to the holder of Figs. 37 and 38, Fig. 40 is a longitudinal sectional view of still another holder that is closely similar to the holder of Figs. 37 and 38, Fig. 41 is a perspective view of another form of protector for electric circuits that has the rating-regulating surfaces of the present invention on it, Fig. 42 is a perspective view of a movable terminal that is usable with the protector of Fig. 41, Fig. 43 is a partially sectioned view, on a larger scale, of the movable terminal and part of the protector of Figs. 41 and 42, and Fig. 44 is a partially sectioned view, on said larger scale, of another movable terminal and of the terminal of another protector for electric circuits.

Referring to the drawing in detail, the numeral 40 denotes the body of a holder for protectors for electric circuits. This body is shown as being made of electrically resisting material, as for example, nylon, Bakelite or the like. A radially extending flange 42 is provided at one end of that body and that flange is preferably formed when the body 40 is molded. The flange 42 coacts with the body 40 to define a recess 44 which has an open end. The flange 42 also has an annular recess 46 that is contiguous with the recess 44.

The inner end of the recess 44 is defined by an end wall of the body 40, and an opening 48 is provided in that end wall. This opening accommodates the cylindrical shank of a terminal 50. That terminal is formed of electrically conducting material and it has a generally flat face and a planished end. In actual practice the generally flat face of the terminal 50 may have a rim on it to permit that terminal to accommodate the ends of protectors for electric circuits which may have small particles of solder adhering to them. However, that rim will not affect the operation of the terminal and it should be regarded as being a part of a generally flat face on the terminal 50. An opening 52 is formed in the planished end of the terminal. A helical spring 54 surrounds the cylindrical shank of the terminal 50 and it bears against the rear face of the generally flat face of that terminal. The other end of that spring bears against the wall through which the opening 48 extends. This spring, therefore, biases the generally flat face of the terminal 50 toward the open end of the recess 44 in the body 40. However, that spring will be unable to force the terminal 50 out of the opening 48 because the planished end of the terminal 50 is wider than the diameter of the opening 48. In assembling the body 40 with the terminal 50, the terminal is initially formed with a shank of continuous diameter and that shank has a diameter permitting it to pass through the opening 48. The shank of the terminal 50 is passed through the helical spring 54 and then the spring and terminal are introduced into the recess 44 in the body 40. The end of the shank of the terminal is then urged through the opening 48 and thereafter a tool is brought into engagement with the projecting end of the shank of the terminal 50 to planish it. The opening 52 in the planished portion of the terminal can receive a lead from an electrical circuit and can facilitate the soldering of that lead to that terminal.

The numeral 56 denotes a notched element of annular form which is made of electrically conducting material. Specifically, the notched element is made of a ductile metal such as soft brass. A solder lug 58 is formed on the notched element 56, and that solder lug extends radially outwardly from that element. An opening 60 is provided in the lug 58, and that opening receives another lead from a circuit. The opening will facilitate the soldering of that lead to the lug 58. A number of securing tabs 62 are provided on the notched element 56, and those securing tabs can be bent behind the flange 42 of the body 40 of the holder. These securing tabs will permanently secure the notched element 56 to the body 40.

A pair of diametrically opposed notches 64 are provided in the front face of the notched element 56. A pair of rotation-resisting recesses 66 are formed in the front face of the notched element 56, and those recesses are displaced approximately ninety degrees from the notches 64. Inclined faces 68 are formed in the front face of the notched element 56, and those inclined faces serve as the leading and trailing edges of the rotation-resisting recesses 66.

As will be brought out more fully hereinafter, a number of individually different notched elements can be prepared for assembly with bodies 40 for various holders. This is desirable since it enables manufacturers to settle on bodies 40 of standard form and dimensions and to obtain a number of individually different holders for protectors for electric circuits merely by assembling those identical bodies with individually different notched elements. Specifically, the notched elements will differ in the size or configuration of the notches formed therein.

In some instances a number of notched elements will differ from each other only in the width of the notches, and in such instances the rotation-resisting recesses 66 will be as large as the largest of the notches. This will enable one size and type of die to form all of the rotation-resisting recesses for that series of notched elements.

The numeral 70 denotes the casing of a cartridge-type protector for electric circuits. That casing has a cup-shaped terminal 72 at the inner end thereof and has a cup-shaped terminal 74 at the outer end thereof. The cup-shaped terminal 74 is longer than the standard-length cup-shaped terminal 72 at the inner end thereof. These terminals will be electrically connected by the element or elements that are within the casing 70 of the protector. The cup-shaped terminal 74 has radially-extending projections 76 at the inner edge thereof. Those projections are spaced from the outer end of the terminal 74 a distance greater than the overall length of the terminal 72. Hence, the presence of the projections 76 on the terminal 74 will not keep the terminal 74 from fitting within standard fuse clips.

The terminal 72 is dimensioned to fit within the recess 44 of the body 40 and to have a small amount of "play," but the projections 76 extend outwardly beyond the diameter of the recess 44. Consequently, it would not be possible to reverse the protector for electric circuits and telescope the terminal 74 within the recess 44 and cause that terminal to engage the terminal 50.

The projections 76 are dimensioned to fit into and to pass through the notches 64 in the notched element 56. After passing through the notches 64, the projections 76 will enter the annular recess 46 in the flange 42; and thereafter rotation of the protector for electric circuits will place the projections 76 in register with the rotation-resisting recesses 66. In order to move the projections 76 through the notches 64 of the notched element 56, the spring 54 has to be compressed by the action of the protector terminal 72 on the inner terminal 50. Hence, at the time the protector is rotated to place the projections 76 in register with the rotation-resisting recesses 66, the spring 54 is compressed. When the force, that was used to move the protector, is released the spring 54 will force the projections 76 into holding engagement with the rotation-resisting recesses 66. The notched element 56 and the projections 76 on the terminal 74 provides a bayonet lock joint.

The recesses 66 are displaced from the plane of the face of the notched element 56 by the inclined surfaces 68 which serve as the leading and trailing edges of those recesses. Those inclined surfaces facilitate the rotation of the protector whenever it is desired to remove that protector from the holder, but they will not facilitate accidental removal of that protector from that holder.

The projections 76 will closely fit the notches 64 in the notched element 56, and the notches 64 will not pass projections which are larger than the projections 76. Hence, the notches 64 coact with the projections 76 to limit the rating of the protectors that can be inserted in the holder of Figs. 1 and 2.

It would, of course, be possible to insert protectors for electric circuits in the holder of Figs. 1 and 2 if those protectors had projections narrower than projections 76. However, that is not objectionable since those protectors will have ratings smaller than the rating of the protector bearing the projections 76. The notches 64 and the projections 76 prevent over-fusing and need not attempt to prevent under-fusing of the circuit, since under-fusing of the circuit cannot lead to an undesirable condition in that circuit.

When the protector for electric circuits is mounted within the holder of Figs. 1 and 2, current will pass from the lead, not shown, connected to the opening 52 of the terminal 50, through the terminal 72 of the protector, through the protector to the terminal 74, through the projections 76 to the notched element 56, and then to the lead, not shown, connected to the opening 60 of the soldering lug 58. The spring 54 will urge the projections 76 tightly against the rotation-resisting recesses 66 and will thus assure low-resistance engagement between the protector and the notched element 56.

Figs. 3, 3A and 3B disclose a holder for protectors for electric circuits wherein the notched element is of insulating material. In that holder the body is denoted by the numeral 78; and that body has a flange which is generally similar to the flange 42 on the body 40. A recess 80 is formed in the body 78, and that recess is generally similar to and serves the same purpose as recess 44 in the body 40. A recess 88, similar to the recess 46 in the body 40, is provided in the end of the body 78. A notched element 82 of annular form is mounted on the exterior of the body 78 adjacent the open end of the recesses 80 and 88. That notched element is of insulating material and it is secured to the body 78 by rivets 84. A recess is provided at the inner face of the notched element 82, and that recess telescopes over the end of the body 78. The notched element 82 coacts with the recess 88 to define an annular space for the projections on the terminal of a protector for electric circuits.

Two diametrically opposed notches 90 are formed in the outer face of the notched element 82, and those notches communicate with the annular recess 88 in that notched element. Two diametrically opposed rotation-resisting recesses 92 are provided on the notched element 82, and those recesses are spaced approximately ninety degrees from the notches 90. Inclined surfaces 94 serve as the leading and trailing edges of the rotation-resisting recesses 92. The notched element 82 is generally similar to the notched element 56 of Figs. 1 and 2, but it is of insulating rather than electrically conducting material and it does not have a solder lug.

Because the notched element 82 is of insulating material, it can not serve as one of the terminals for the holder for protectors for electric circuits. Instead, it serves only to lock the protector in position within the holder. The notched element 82 will receive protectors for electric circuits of the type shown in Figs. 1 and 2. The projections 76 on such terminals can be moved through the notches 90 into the annular recess 88 and can then be rotated into register with the rotation-resisting recesses 92. The notches 90 coact with the projections 76 and with the rotation-resisting recesses 92 to provide a bayonet joint lock.

The protectors that are held by the holder of Figs. 3, 3A and 3B will have their inner terminals connected to the circuit by the terminal 50, and will have their outer terminals connected to the circuit by a harness cap. Such a cap is usually cup-shaped and is resilient so it can telescope over the outer end of the protector and assure good electrical contact with that terminal.

The numeral 96 denotes a cup-shaped terminal for protectors for electric circuits which is generally similar to the terminal 74. The terminal 96 has just one projection 98 whereas the terminal 74 had two projections 76. The terminal 96 can be used with the notched element 100 of Figs. 7–9. That notched element has a solder lug 102 with an opening 104 therein. Securing tabs 106 are provided on the notched element 100, and those tabs can be bent behind the flange 42 of a body 40. In that way, the notched element 100 can be permanently secured to the body 40.

The notched element 100 has a notch 108 that can receive the projection 98 on the terminal 96. That element also has two rotation-resisting recesses 110. Inclined surfaces 112 serve as the leading and trailing edges of those recesses. The notch 108 in the notched element 100 will closely receive the projection 98 on the terminal 96 and will prevent the insertion of a terminal with a larger projection, as for example the terminal 114 of Fig. 10. That terminal has a projection 116 which is wider than the projection 98 on the terminal 96 of Figs.

4–6, and which is also wider than the notch in the notched element 100 of Figs. 7–9.

The projection 116 on the terminal 114 will, however, fit within the notch 124 of the notched element 118 of Fig. 11. That notched element has a solder lug 120 with an opening 122 therein and it has two rotation-resisting recesses 126 plus inclined surfaces 128 that serve as the leading and trailing edges of the recesses 126. The notched element 118 is closely similar to the notched element 100, but it differs from the notched element 100 in having a wider notch 124. Hence, the notched element 118 can receive the terminal 114 with the projection 116 thereon while the notched element 100 cannot.

The rotation-resisting recesses 126 and 110 of the notched elements 118 and 100 respectively are of the same size. This makes it possible to use the same die to form all of the rotation-resisting recesses in a series of notched elements, which elements differ only in the size of the notches therein. If the terminal 96 were inserted in the notched element 118, the projection 98 on that terminal could be set within the recess 126. That same recess will also accommodate the larger projection 116 on the terminal 114 whenever that terminal is inserted in the notched element 118.

The numeral 130 denotes the terminal of Fig. 14, and that terminal has projections 132 thereon. The terminal 130 of Fig. 14 is very similar to the terminal 74 of Figs. 1, 2 and 12. The principal difference between the terminal 74 and the terminal 130 is that projections 76 on the terminal 74 are narrower than the projections 132 on the terminal 130. This difference in the width of the projections enables the terminal 74 to be used with the notched element 56 of Figs. 1, 2 and 13 but prevents the terminal of Fig. 14 from being used with that notched element. Instead, terminal 130 is used with the notched element 134 of Fig. 15. That notched element has a solder lug 136 with an opening 138 through it. That notched element also has a pair of diametrically opposed notches 140 which are dimensioned to closely receive the projections 132 on the terminal 130. In addition, the notched element 134 has two diametrically opposed rotation-resisting recesses 142 which have inclined surfaces 144. Those inclined surfaces constitute the leading and trailing edges of the rotation-resisting recesses 142.

Figs. 4 and 10 disclose terminals which are generally similar and which differ principally in the size of the projections thereon. Similarily, Figs. 12 and 14 show terminals that are closely similar and that differ principally in the size of the projections thereon. The projections on the terminals of Figs. 4 and 10 are, however, different from the projections on the terminals of Figs. 12 and 14; there being just one projection on each of the terminals of Figs. 4 and 10. Thus, the terminals of Figs. 4 and 10 are representative of a series of terminals that are alike in configuration but different in size, and the terminals of Figs. 12 and 14 are typical of a series of terminals that are alike in configuration but different in size; but the two series of terminals are themselves different.

The terminals of Figs. 4 and 10 typify a series of terminals which can be used with protectors for electric circuits that have a predetermined range of ratings. The terminal 96 of Fig. 4 will be affixed to a protector having a smaller rating than that of the protector to which the terminal 114 of Fig. 10 is affixed. Other terminals which have configurations comparable to the configurations of terminals 96 and 114 will be affixed to protectors having ratings different from the ratings of the protectors to which terminals 96 and 114 are affixed. However, there will be a correlation between those various terminals and those various protectors for electric circuits in that the greater the rating of the protector for electric circuits, the greater the width of the projection on the terminal for that protector for electric circuits.

Similarly, the terminals 74 and 130 of Figs. 12 and 14 typify a series of terminals which can be used with protectors for electric circuits that have another range of ratings. The terminal 74 of Fig. 12 will be mounted on a protector which has a smaller rating than that of the protector on which the terminal 130 of Fig. 14 is mounted. Other terminals having the general configuration of terminals 74 and 130 will be connected to other protectors; and again, the higher the ratings of the protector the wider the projection on the terminal for that protector.

Because the single-projection terminals 96 and 114 of Figs. 4 and 10 could be used in the doubly-notched elements 56 and 134 of Figs. 13 and 15, the protectors to which the terminals 96 and 114 are secured must have ratings that are no greater than those of the protectors to which the two-projection terminals 74 and 130 are attached. In actual practice, the single-projection terminals, such as 96 and 114, will be used with protectors that have a rather low range of ratings; while the two-projection terminals, such as 74 and 130, will be used with protectors that have a higher range of ratings. This is desirable since it will keep the insertion of protectors that have one-projection terminals, in holders having doubly-notched elements, from over-fusing the circuits. While the insertion of protectors, that have two-projection terminals, in holders that have singly-notched elements would lead to over-fusing of the circuit; the singly notched elements will positively prevent any such insertion. In this way, harmless interchanging of rating-regulated protectors is permitted, while any interchanging that might tend to be otherwise is positively prevented.

The numeral 146 denotes a terminal for a protector for electric circuits, and that terminal has two radially extending projections 148 thereon. These projections are not diametrically opposed; instead, they are spaced so the center lines thereof are one hundred and seventy degrees apart. As a result, the terminal 146 cannot extend into the notched element 56 which receives terminal 74 or into notched element 134 which receives terminal 130. Instead the terminal 146 must extend into the notched element 150. That element has a solder lug 152 and that solder lug has an opening 154 through it. The notched element 150, which is of annular form, also has two notches 156. These notches, like projections 148 on terminal 146, are spaced apart one hundred and seventy degrees. Moreover, the angular relation between the notches 156 is complementary to the angular relation between the projections 148; that is, the notches 156 and the projections 148 are on the same side of a diameter of the protector for electric circuits used with that protector and with that notched element. The notched element 150 also has two angularly spaced rotation-resisting recesses 158. Those recesses have inclined surfaces 160 which define the leading and trailing edges of those recesses. The center lines of the recesses 158 are spaced apart a distance of one hundred and seventy degrees. Hence, the projections 148 on the terminal 146 can not only pass through the notches 156 but can be made to rest in the recesses 158.

It would be possible to make a totally distinct series of terminals and notched elements which have the same angular distance between the projections and notches by disposing the projections and notches on the opposite side of a diameter of the protector used with those terminals and notched elements. This shows the considerable number of different combinations of terminals and notched elements that are made possible by the present invention.

The numeral 162 denotes a terminal which is very similar to the terminal 146. The terminal 162 has two projections 164 thereon and those projections have the same angular spacing between them that the projections 148 have. However, the projections 164 are wider than the projections 148. Hence, the terminal 162 cannot be used with the notched element 150. Instead, that terminal must be used with the notched element 166. That latter notched element has a solder lug 168 with an opening 170 through it. That latter notched element also has two angularly spaced notches 172 which can receive the projections 164 on the terminal 162. In addition, the notched element 166 has rotation-resisting recesses 174 that are equipped with inclined leading and trailing edges 176. Those rotation-resisting recesses have the same angularity that the projections 164 and the notches 172 have, and thus they can receive the projections 164 on the terminal 162.

While the terminal 162 cannot be used with the notched element 150, the terminal 146 can be used with the notched element 166. However, this is not objectionable because the terminal 146 will be used with a protector for electric circuits which has a rating smaller than the rating of the protector with which the terminal 162 is used. Here again, the present invention prevents over-fusing of the circuit but freely permits the harmless under-fusing of the circuit. No danger of fire or no danger to the equipment of the circuit can result from under-fusing; all that can result is the repeated replacement of the protector for electric circuits. The user will quickly recognize the need of a larger protector for electric circuits and will then obtain and use the protector intended for the particular holder in question.

The numeral 178 denotes a terminal with radially extending projections 180. These projections are spaced apart a distance of one hundred and sixty degrees. Hence, these projections differ from the projections 148 of terminal 146 and the projections 164 of terminal 162. Furthermore, because of the angular differences between these three terminals, the terminal 178 cannot be used with the notched element 154 or the notched element 166. Instead, the terminal 178 must be used with the notched element 182. That notched element has a solder lug 184 which has an opening 186 through it. That notched element also has two notches 188 which are spaced apart a distance of one hundred and sixty degrees. Furthermore, the notched element 182 has two rotation-resisting recesses 190 that are spaced apart a distance of one hundred and sixty degrees. The recesses 190 have inclined trailing and leading edges 192.

Not only will the terminal 178 be unusable with the notched elements 150 and 166, but the terminals 146 and 162 will be unusable with the notched element 182. In this way, the present invention attains safe manufacture and use of a large number of protectors for electric circuits of different ratings, even though the protectors have the same length and diameter.

The numeral 194 denotes a terminal which is closely similar to the terminal 178. However, the projections 196 on the terminal 194 are wider than the projections 180 on the terminal 178. The wide projections 196 on the terminal 194 will not pass through the notches 188 of the notched element 182. Instead, those projections must be used with the notches 204 of the notched element 198. That notched element has a solder lug 200 which has an opening 202 through it. In addition, that notched element has rotation-resisting recesses 206 which are spaced apart a distance of one hundred and sixty degrees. Those recesses have inclined trailing and leading edges 208.

The terminals 178 and 194 of Figs. 20 and 22 are generally similar to the terminals 146 and 162 of Figs. 16 and 18, but the angular relationship between the projections on those terminals keeps the terminals of Figs. 20 and 22 from being used in the notched elements for the terminals of Figs. 16 and 18. Similarly, that angular relationship keeps the terminals of Figs. 16 and 18 from being used with the notched elements for the terminals 20 and 22. If the terminals 178 and 194 had the projections set to the left side of center rather than to the right side of center, still another series of terminals could be provided.

The numeral 210 denotes a terminal for a protector for electric circuits, and that terminal has three equally spaced projections 212. This terminal can be used with the notched element 214 which has a solder lug 216 on it. That solder lug has an opening 218 through it. The notched element 214 has three notches 220 which are equally spaced apart. Those notches are dimensioned to receive the projections 212 on the terminal 210. If desired, the notched element 214 could be equipped with three equally-spaced rotation-resisting recesses similar to the rotation-resisting recesses of the notched elements 56, 100, 118, 134, 150, 166, 182, and 198.

The terminal 210 will be unable to telescope into any of the notched elements 56, 100, 118, 134, 50, 166, 182, or 198 because those notched elements do not have three equally-spaced notches. It would be possible to vary the angular distance between the three projections on the terminal 210 and develop a considerable number of series of terminals which could not be used in the same notched element. This proves, once again, the great versatility of the present invention and shows how vast a range of protectors for electric circuits can be rating-regulated.

The numeral 222 denotes a terminal which is similar to the terminal 210. However, the projections 224 on the terminal 222 are wider than the projections 212 on the terminal 210. Hence, the terminal 222 can not be used with the notched element 214. Instead, that terminal must be used with the notched element 226, which has a solder lug 228 with an opening 230 through it. That notched element also has three equally-spaced notches 232 which accommodate the projections 224 on the terminal 222.

The notched element 226 will also receive the terminal 210, but this will not be hurtful since the protector with which the terminal 210 will be used will have a rating less than the rating of the protector with which the terminal 222 will be used. The present invention therefore, again permits harmless interchanging of protectors for electric circuits but prevents any interchanging that would tend to be harmful.

The one-projection terminals of Figs. 4 and 10 could be used with the notched elements 214 and 226 of Figs. 25 and 27. Hence, the notched elements 214 and 226 of Figs. 25 and 27 must be used with protectors for electric circuits that have ratings at least as great as the ratings of the protectors with which the terminals of Figs. 4 and 10 are used. In practice, the terminals of Figs. 4 and 10 will be used on the series of protectors having the smallest ratings, and the notched elements of Figs. 25 and 27 will be used with protectors having greater ratings.

The numeral 234 denotes a terminal for a protector for electric circuits which has two projections thereon. One of those propections is denoted by the numeral 236 while the other, and wider, projection is denoted by the numeral 238. The projection 236 on the terminal 234 is located intermediate the ends of that terminal and is spaced farther from the open end of the cup-shaped terminal 234 than is the projection 238. Consequently, when the terminal 234 is inserted in the opening of the annular notched element 240 and is rotated out of register with the notches 246 and 248 of that notched element, the projection 236 will be closer to the inner face of the notched element 240 than will be the projection 238. As a result, the projection 236 alone would engage the rotation-resisting recess 245 of the notched element 240. That recess has inclined leading and trailing edges 247. The notched element 240 also has a solder lug 242 with an opening 244 therethrough. The projection 236 will coact with the rear surface of the front face of the notched element 240 to provide a bayonet joint lock, while the projection 238 will merely serve as a rating-regulating surface. Thus, the projection 236 serves the dual function of being a rating-regulating surface and a part of the bayonet joint lock.

The numeral 250 denotes a terminal which is closely similar to the terminal 234. However, the projection 252 on the terminal 250 is wider than the projection 236 on the terminal 234. The projection 254 on the terminal 250 has the same width as the projection 238 on the terminal 234. Because the projection 252 on the terminal 250 is wider than the projection 236 on the terminal 234, the terminal 250 cannot be used with the notched element 240. Instead, the terminal 250 will be used with the notched element 256. That notched element has a notch 262 to receive the projection 252 and a notch 264 to receive the projection 254. The notched element 256 has a solder-lug 258 and an opening 260 in that solder lug. Moreover, the notched element 256 has a rotation-resisting recess 255 with inclined leading and trailing edges 257. That rotation-resisting recess will accommodate the projection 252 on the terminal 250. The terminals 234 and 250 typify a range of terminals which can be used with a series of protectors for electric circuits that have different ratings.

It would be possible to make a series of terminals that are comparable to the terminals 234 and 250 but wherein the projections 238 and 254 lay in the same plane with the projections 236 and 252. Where that was done, both projections on each terminal would serve as rating-regulating surfaces and as bayonet-joint lock components. In such instances, the notched elements would have two rotation-resisting recesses.

It would be possible to make still other series of terminals for protectors for electric circuits by setting the projections of the terminals of Figs. 28 and 30 at different angles to each other. This shows once again how many different series of terminals and notched elements could be provided by the present invention.

The numeral 300 denotes a notched element which is generally similar to the notched elements 56, 100, 118, and 134. However, instead of having a portion of its face formed so it is spaced forwardly of the plane of that face, the notched element 300 has a portion of its face formed so it is spaced rearwardly of the plane of that face. Specifically, the notched element 300 has diametrically opposed surfaces 304 which are spaced rearwardly of the plane of the face of said notched element.

The notched element 300 has a centrally located opening 302, and it has two notches 306 which are contiguous to the opening 302. Those notches are formed in the surfaces 304 that are disposed rearwardly of the plane of the face of that notched element. The notches 306 are thus displaced from other portions of the notched element 300; and it will be noted that this is also true of the notched elements 56, 100, 118 and 134. Moreover, it will be noted that the areas of the notched element 300 between the notches 306 are bounded by inclined surfaces, just as the rotation-resisting recesses of notched elements 56, 100, 118 and 134 are bounded. Hence, the areas between the notches 306 will serve as rotation-resisting recesses.

The notches 306 receive projections 310 on a terminal 308. The notches 306 are dimensioned so they just receive the projections 310, and thus they will be able to reject terminals with larger projections.

The principal difference between the notched element 300 and the notched elements 56, 100, 118 and 134 is the fact that the notches 306 are spaced rearwardly of the plane of the face of that notched element. This is intended to make it even more difficult for a repair man or others to "open up" or enlarge the notches as by prying or bending the metal defining the notches with a screw driver or other instrument. The forming of the metal of the notched element to dispose the surfaces 304 rearwardly of the plane of the front face of the notched element 300 tends to stiffen that metal so it can resist any prying or enlarging action. Furthermore, the forming of the metal of the notched element to dispose the notches 306 rearwardly of the plane of the face of the notched element 300 makes it harder for the repair man or others to reach the notches 306 with a screw driver or other instrument.

The function and purpose of the notches 306 are the same as the purpose and function of the notches 64 and 140 of the notched elements 56 and 134, respectively. The notches 306 are, however, even harder to "open up" or enlarge. Hence, the notched element 306 offers even greater resistance to abuse than do the notched elements 56 and 134.

The numeral 312 denotes a notched element that is similar to the notched element 300, but which has wider notches. The notches 318 of the notched element 312 are located in the surface 316 that is disposed rearwardly of the plane of the face of that notched element. Those notches are appreciably wider than the notches 306, and they will accommodate the wide projections 322 on the terminal 320. However, the projections 322 on terminal 320 cannot be accommodated by the narrower notches 306 of the notched element 300. This prevents the insertion of the terminal 320 in the holder with which the notched element 300 is associated.

The smaller projections 310 on the terminal 308 will, however, fit in the notches 318 of the notched element 312. This is not objectionable since the protector with which the terminal 308 is associated will have a smaller rating than the protector with which the terminal 320 is associated.

The numeral 324 denotes another form of body for a holder for protectors for electric circuits. As indicated particularly in Figs. 38–40, the body 324 has a longitudinally extending rib 326. That rib has a slot 327 through it, and the slot 327 receives the solder tab or lug 328 of the notched element 300. An opening 330 is provided in the solder tab 328, and that opening can receive the lead of a circuit to be protected by the protector insertible in the holder 324.

The body 324 has an elongated cylindrical cavity 332 and it has an annular recess 334 at the outer end of the cavity 332. The recess 334 and the cavity 332 are in communication with each other.

In assembling the notched element 300 with the body 324, the end of the solder tab 328 is threaded through the slot 327 in the rib 326. Thereafter, holding tabs 325 are bent over a flange at the left hand end of the body 324.

As indicated by Figs. 38–40, the body 324 can receive different movable terminals. Specifically, the body 324 in Fig. 38 has a short movable terminal 336 and the body 324 in Fig. 39 has a longer movable terminal 340, while the body 324 of Fig. 40 has a still longer movable terminal 348. Those terminals initially have shanks of constant diameter that can easily extend through openings in the right hand end walls of the bodies 324. Those shanks will also telescope readily within helical compression springs, such as the springs 338, 342 and 350 of Figs. 38–40 respectively. The shanks of the movable elements are passed through the helical springs and then through the openings in the end walls of the bodies 324, and thereafter the ends of those shanks are planished. This planishing of the shank ends prevents separation of the movable terminals from the bodies 324. Moreover, that planishing of the shank ends limits the distances which those movable terminals can move to the left, as they are viewed in Figs. 38–40.

In particular, the planished end of the movable terminal 336 enables the left hand end face of the movable terminal 336 to move far enough to the left, under the bias of spring 338, to engage the right hand terminal of the long protector 339, but it will keep that left hand end face of that movable terminal from moving far enough to the left to engage the right hand terminal of the shorter protector 344 of Fig. 39. This is desirable because it enables the length of the protectors for electric circuits to enter into the rating-regulating program. More particularly, the planished end of movable terminal 336 will keep the left hand end face of that terminal from making contact with the protector 344 of Fig. 39 if that protector was inserted in the holder of Fig. 38. Similarly, that planished end of movable terminal 336 will keep the left hand end face of that terminal from making contact with the protector 352 of Fig. 40 if that protector was inserted in the holder of Fig. 38. Hence, even though the bodies of Figs. 38–40 are identical, and even though the notched elements 300 on those bodies are identical, the holders of Figs. 38–40 can distinguish between the protectors 339, 344 and 352. By giving those protectors different ratings, it is possible to enable the holders of Figs. 38–40 to distinguish between protectors having different ratings.

In practice, the elongated protector 339 has been made with a rating higher than that of the protectors 344 and 352, and the protector 344 has been made with the next highest rating. However, such an arrangement is not vital.

The holder of Fig. 39 has a longer movable terminal 340, and it has a longer spring 342. The spring 342 will bias the movable terminal 340, and thus protector 344, toward the notched element 300; and it will thus urge that protector into electrically conducting engagement with that notched element. However, the planished end of that movable terminal will limit the movement of that terminal to the left. Hence, the movable terminal 340 could not make electrical contact with the protector 352 if that protector was inserted in the holder of Fig. 39.

The spring 342 will yield to permit the insertion and locking of the protector 344, but its compressed height is so great that the protector 339 will not be able to enter the holder of Fig. 39 sufficiently to have its projections 310 enter the notches 306. Hence the planished end of terminal 340 will coact with the length of the spring 342 to accept protector 344 while rejecting protectors 339 and 352. Consequently, the planished ends on the terminals coact with the springs to carry out the rating-regulating program.

The holder of Fig. 40 has a spacer 346 and has a still longer movable terminal 348. The planished end of that movable terminal lets that terminal approach the open end of cavity 332 while still keeping that movable terminal from becoming separated from the body 324. The spacer 346 coacts with the compressed height of the spring 350 to keep protectors 339 and 344 from being locked in position in the holder of Fig. 40.

From a study of Figs. 38–40 it should be apparent that protectors for electric circuits can be made in different lengths to provide additional rating-regulaing ranges. Specifically, the protector shown in Fig. 38 could have any of the terminals shown in Figs. 1, 2, 4, 6, 10, 12, 14, 16, 18, 20, 22, 24, 26, 28 and 30. Similarly, the protectors in Figs. 39 and 40 could have any of those terminals for rating-regulating purposes. In effect, the protectors of Figs. 38–40 show that the rating-regulating surfaces of Figs. 1–36 can be multiplied several times over by using protectors of different lengths.

The numeral 354 denotes the inner terminal of yet another protector for electric circuits. That terminal has a centrally-located, axially-extending projection 356 thereon. That protector also has a terminal 308 with projection 310 thereon. The axially extending projection 356 is dimensioned to fit in an opening in an annular insulator 360 carried on a movable terminal 358. The movable terminal will be of metal but will have a part of its left hand face covered and protected by the annular insulator 360. As indicated in Figs. 43, the projection 356 will extend through the opening in the annular insulator 360 to engage the left hand end face of the movable terminal 358. Larger projections will be unable to pass through the opening in that insulator to reach the end of terminal 358. Hence the projection 356 coacts with the insulator 360 to provide rating-regulation.

The left hand end of the terminal 358 is made cup-shaped, and the end of the cup-shaped section is rolled inwardly into a groove 361 in the insulator 360. The groove 361 will coact with the inwardly rolled end of the cup-shaped section to maintain the insulator 360 in assembled relation with the terminal 358, while permitting relative rotation of that insulator and terminal. Such rotation enables the passageway through the insulator 360, and enables the projection 356, to be made a circular or eccentric. Hence, further rating-regulating ramifications are possible.

Fig. 44 discloses a movable terminal 366 which carries an annular insulator 368. That annular insulator can receive the projection 364 on a terminal 362 for a protector for electric circuits. The projection 364 is larger than the opening in the annular insulator 360, and it will not be able to reach and engage the movable terminal 358. On the other hand, the projection 356 can extend through the larger opening in the larger annular element 368 and can reach and engage the movable element 366. This, of course, is not objectionable since the protector with which the terminal 354 is used will have a lower rating than the protector with which the terminal 362 is used.

The combination of rating-regulating terminals, such as 308, at one end of the protectors and the rating-regulating surfaces, such as the projections 356 and 364, at the other end, further increases the number of possible combinations of ratings that can be regulated by the present invention. The various combinations provided by the present invention are ample to meet the requirements of the art.

In assigning terminals to protectors in various rating ranges, the principal precaution to be observed is that terminals which have universal application, as for example the terminals of Figs. 4 and 10, must be used with protectors having the smallest ranges of rating. Moreover, the lowest-range protectors in any given series of protectors must be given the smallest width projections for the terminals thereof. With the concept of the present invention, it is possible to provide a vast number of rating-regulated protectors for electric circuits that can be used in standard fuse clips but which can also be used in rating-regulated holders. Hence, the present invention provides protectors for electric circuits which are very versatile and which can still provide the utmost in protection agianst overfusing of circuits.

The present invention can provide a number of different ranges of ratings by using projections of different heights. Thus, the projections on terminals 96 and 114 and similar terminals can provide a predetermined range of ratings; and those terminals could be made to provide an additional and different range of ratings by increasing the heights of the projections thereon. The increasing of the heights of the projections on the various terminals thus makes it possible to double the number of rating-regulated ranges.

The present invention also makes it possible to distinguish between fuses of the same rating but different electrical characteristics. For example, loaded link fuses could be equipped with terminals that are distinctively different from the terminals for other fuses.

Whereas a number of preferred embodiments of the present invention have been shown and described in the drawing and accompanying description it should be apparent to those skilled in the art that various changes may be made in the form of the invention without affecting the scope thereof.

What I claim is:

1. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of said recess, the improvement which comprises an electrically conducting terminal that is carried by said holder and is in communication with said recess and that is selectively engaged by the first said terminal of said protector for electric circuits, said holder-carried terminal being connectible to an electric circuit, another electrically conducting terminal that is selectively connectible to said electric circuit and that selectively and directly engages said second terminal of said protector for electric circuits to connect said protector for said electric circuits to said electric circuit, a rating-regulating surface of a predetermined size and configuration on and movable with said protector for electric circuits, and a complementary rating-regulating surface carried by said holder, said rating-regulating surfaces coacting to lock the first said terminal of said protector for electric circuits in electrically conducting engagement with said holder-carried terminal and to prevent the locking, in electrically conducting engagement, of said holder-carried terminal and the first terminal of another protector for electric circuits that is similar to said protector for electric cicuits but has a rating-regulating surface that differs from said rating-regulating surface of the first said protector for electric circuits, said holder-carried terminal being disposed adjacent the inner end of said recess and being spring-biased toward said opening in said holder, said terminals of said protector for electric circuits being tubular and having portions thereof that are uninterrupted and are insertable in standard fuse clips, whereby said protector for electric circuits can be selectively held in said holder or in standard fuse clips.

2. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of said recess, the improvement which comprises an electrically conducting terminal that is carried by said holder and is in communication with said recess and that is selectively engaged by the first said terminal of said protector for electric circuits, said holder-carried terminal being connectible to an electric circuit, another electrically conducting terminal that is selectively connectible to said electric circuit and that selectively and directly engages said second terminal of said protector for electric circuits to connect said protector for said electric circuits to said electric circuit, a rating-regulating surface of a predetermined size and configuration on and movable with said protector for electric circuits, and a complementary rating-regulating surface carried by said holder, said rating-regulating surfaces coacting to lock the first said terminal of said protector for electric circuits in electrically conducting engagement with said holder-carried terminal and to prevent the locking, in electrically conducting engagement, of said holder-carried terminal and the first terminal of another protector for electric circuits that is similar to said protector for electric circuits but has a rating-regulating surface that differs from said rating-regulating surface of the first said protector for electric circuits, the rating-regulating surfaces of said protectors for electric circuits being on the second terminals of said protectors for electric circuits, said terminals of said protector for electric circuits being tubular and having portions thereof that are uninterrupted and are insertable in standard fuse clips, whereby said protector for electric circuits can be selectively held in said holder or in standard fuse clips.

3. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of said recess, the improvement which comprises an electrically conducting terminal that is carried by said holder and is in communication with said recess and that is selectively engaged by the first said terminal of said protector for electric circuits, said holder-carried terminal being connectible to an electric circuit, another electrically conducting terminal that is selectively connectible to said electric circuit and that selectively and directly engages said second terminal of said protector for electric circuits to connect said protector for said electric circuits to said electric circuit, a rating-regulating surface of a predetermined size and configuration on and movable with said protector for electric circuits, and a complementary rating-regulating surface carried by said holder, said rating-regulating surfaces coacting to lock the first said terminal of said protector for electric circuits in electrically conducting engagement with said holder-carried terminal and to prevent the locking, in electrically conducting engagement, of said holder-carried terminal and the first terminal of another protector for electric circuits that is similar to said protector for electric circuits but has a rating-regulating surface that differs from said rating-regulating surface of the first said protector for electric circuits, said rating-regulating surface of said holder being immediately adjacent said opening at said one end of said recess.

4. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of said recess, the improvement which comprises an electrically conducting terminal that is carried by said holder and is in communication with said recess and that is selectively engaged by the first said terminal of said protector for electric circuits, said holder-carried terminal being connectible to an electric circuit, another electrically conducting terminal that is selectively connectible to said electric circuit and that selectively and directly engages said second terminal of said protector for electric circuits to connect said protector for said electric circuits to said electric circuit, a rating-regulating surface of a predetermined size and configuration on and movable with said protector for electric circuits, and a complementary rating-regulating surface carried by said holder, said rating-regulating surfaces coacting to lock the first said terminal of said protector for electric circuits in electrically conducting engagement with said holder-carried terminal and to prevent the locking, in electrically conducting engagement, of said holder-carried terminal and the first terminal of another protector for electric circuits that is similar to said protector for electric circuits but has a rating-regulating surface that differs from said rating-regulating surface of the first said protector for electric circuits, said rating-regulating surface of said holder being on said other terminal, said terminals of said protector for electric circuits being tubular and having portions thereof that are uninterrupted and are insertable in standard fuse clips, whereby said protector for electric circuits can be selectively held in said holder or in standard fuse clips.

5. In the combination of a protector for electric circuits which has a predetermined rating and a holder for said protector which accepts electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of said recess, the improvement which comprises an electrically conducting terminal that is carried by said holder and is in communication with said recess and that is selectively engaged by the first said terminal of said protector for electric circuits, said holder-carried terminal being connectible to an electric circuit, another electrically conducting terminal that is selectively connectible to said electric circuit and that selectively and directly engages said second terminal of said protector for electric circuits to connect said protector for said electric circuits to said electric circuit, a rating-regulating surface of a predetermined size and configuration on and movable with said protector for electric circuits, and a complementary rating-regulating surface carried by said holder, said rating-regulating surfaces coacting to lock the first said terminal of said protector for electric circuits in electrically conducting engagement with said holder-carried terminal and to prevent the locking, in electrically conducting engagement, of said holder-carried terminal and the first terminal of another protector for electric circuits that is similar to said protector for electric circuits but has a rating-regulating surface that differs from said rating-regulating surface of the first said protector for electric circuits, said rating-regulating surface of said holder being on said other terminal, and said other terminal being secured to said holder immediately adjacent said opening at said one end of said recess.

6. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of said recess, the improvement which comprises an electrically conducting terminal that is carried by said holder and is in communication with said recess and that is selectively engaged by the first said terminal of said protector for electric circuits, said holder-carried terminal being connectible to an electric circuit, another electrically conducting terminal that is selectively connectible to said electric circuit and that selectively and directly engages said second terminal of said protector for electric circuits to connect said protector for said electric circuits to said electric circuit, a rating-regulating surface of a predetermined size and configuration on said protector for electric circuits, and a complementary rating-regulating surface carried by said holder, said rating-regulating surfaces coacting to lock the first said terminal of said protector for electric circuits in electrically conducting engagement with said holder-carried terminal and to prevent the locking, in electrically conducting engagement, of said holder-carried terminal and the first terminal of another protector for electric circuits that is similar to said protector for electric circuits but has a rating-regulating surface that differs from said rating-regulating surface of the first said protector for electric circuits, said rating-regulating surface of the first said protector for electric circuits comprising a projection on and integral with said second terminal of the first said protector for electric circuits, said rating-regulating surface of said holder being a notched element.

7. In the combination of a protector for electric circuits which has a predetermined rating and a holder for said protector for electric circuits wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of said recess, the improvement which comprises an electrically conducting terminal that is carried by said holder and is in communication with said recess and that is selectively engaged by the first said terminal of said protector for electric circuits, said holder-carried terminal being connectible to an electric circuit, another electrically conducting terminal that is selectively connectible to said electric circuit and that selectively engages said second terminal of said protector for electric circuits, a rating-regulating surface of a predetermined size and configuration on said protector for electric circuits, and a complementary rating-regulating surface associated with said holder, said rating-regulating surfaces coacting to lock the first said terminal of said protector for electric circuits in electrically conducting engagement with said holder-carried terminal and to prevent the locking, in electrically conducting engagement, of said holder-carried terminal and the first terminal of another protector for electric circuits that is similar to said protector for electric circuits but has a rating-regulating surface that differs from said rating-regulating surface of the first said protector for electric circuits, said rating-regulating surface of the first said protector for electric circuits comprising a projection, said rating-regulating surface of said holder being a notched element with a rotation-resisting recess, said holder-carried terminal being disposed adjacent the inner end of said recess and being spring-biased toward said rating-regulating surface of said holder and coacting with said rotation-resisting recess to hold said protector for electric circuits against accidental displacement from said holder.

8. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of said recess, the improvement which comprises an electrically conducting terminal that is carried by said holder and is in communication with said recess and that is selectively engaged by the first said terminal of said protector for electric circuits, said holder-carried terminal being connectible to an electric circuit, another electrically conducting terminal that is selectively connectible to said electric circuit and that selectively and directly engages said second terminal of said protector for electric circuits to connect said protector for said electric circuits to said electric circuit, a rating-regulating surface of a predetermined size and configuration on and movable with said protector for electric circuits, and a complementary rating-regulating surface carried by said holder, said rating-regulating surfaces coacting to lock the first said terminal of said protector for electric circuits in electrically conducting engagement with said holder-carried terminal and to prevent the locking, in electrically conducting engagement, of said holder-carried terminal and the first terminal of another protector for electric circuits that is similar to said protector for electric circuits but has a rating-regulating surface that differs from said rating-regulating surface of the first said protector for electric circuits, said rating-regulating surface of said holder being on said other terminal, said other terminal being secured to said holder immediately adjacent said opening at said one end of said recess, said rating-regulating surface of the first said protector for electric circuits comprising a plurality of projections, said rating-regulating surface of said holder having a plurality of notches therein, said projections being selectively registerable with said notches.

9. In the combination of a protector for electric circuits which has a predetermined rating and a holder which accepts said protector for electric circuits and rejects protectors for electric circuits having different ratings and wherein said protector has an elongated casing, a ferrule of electrically conducting material attached to one end of said casing, and a second ferrule of electrically conducting material attached to the other end of said casing, and wherein said holder is elongated and defines an elongated recess and defines an opening at one end of the said recess, the improvement which comprises an electrically conducting terminal that is carried by said holder and is in communication with said recess and that is selectively engaged by the first said ferrule of said protector for electric circuits, said holder-carried terminal being connectible to an electric circuit, another electrically conducting terminal that is connectible to said electric circuit and that selectively and directly engages said second ferrule of said protector for electric circuits to connect said protector for said electric circuits to said electric circuit, a rating-regulating projection of a predetermined size and configuration that projects from a portion of the surface of one of the said ferrules of said protector for electric circuits, said rating-regulating projection having a cross sectional area that is smaller than the area of said portion of said surface of said one ferrule, and a complementary rating-regulating surface carried by said holder, said rating-regulating projection coacting with said rating-regulating surface to permit said protector for electric circuits to electrically engage said holder-carried terminal and to prevent the electrical engagement of said holder-carried terminal and the first ferrule of another protector for electric circuits that is similar to the first said protector for electric circuits but has a rating-regulating projection that differs from said rating-regulating projection of the first said protector for electric circuits, said ferrules of said protectors for electric circuits having portions thereof that are uninterrupted and are insertable in standard fuse clips.

10. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of the said recess, the improvement which comprises an electrically conducting terminal that is carried by said holder and is in communication with said recess and that is selectively engaged by the first said terminal of said protector for electric circuits, said holder-carried terminal being connectible to an electric circuit, another electrically conducting terminal that is connectible to said electric circuit and that selectively and directly engages said second terminal of said protector for electric circuits to connect said protector for said electric circuits to said electric circuit, a rating-regulating projection of a predetermined size and configuration on one of the said terminals of said protector for electric circuits, and a complementary rating-regulating surface associated with said holder, said rating-regulating projection coacting with said rating-regulating surface to permit said protector for electric circuits to electrically engage said holder-carried terminal and to prevent the electrical engagement of said holder-carried terminal and the first terminal of another protector for electric circuits that is similar to said protector for electric circuits but has a rating-regulating projection that differs from said rating-regulating projection of the first said protector for electric circuits, said holder-carried terminal being movable through a path of pre-determined length, said path and the position which one of said terminals of said protector for electric circuits will assume when said protector for electric circuits is disposed within said holder, being partially coextensive but said path being spaced from the positions which the terminals of a shorter protector for electric circuits will assume when said shorter protector is disposed within said holder.

11. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of the said recess, the improvement which comprises an electrically conducting terminal that is carried by said holder and is in communication with said recess and that is selectively engaged by the first said terminal of said protector for electric circuits, said holder-carried terminal being movable relative to said holder and being urged toward said one terminal of said protector for electric circuits and engaging said one terminal of said protector for electric circuits whenever said protector for electric circuits is in inserted position within said recess, said holder-carried terminal having a stop thereon which limits the movement of said holder-carried terminal toward the other end of said recess whereby said holder-carried terminal is unable to engage the terminals of protectors for electric circuits that are shorter than said protector for electric circuits, said holder-carried terminal being connectible to an electric circuit, and another electrically conducting terminal that is connectible to said electric circuit and that selectively engages said second terminal of said protector for electric circuits.

12. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of the said recess, the improvement which comprises an electrically conducting terminal that is carried by said holder and is in communication with said recess and that is selectively engaged by the first said terminal of said protector for electric circuits, said terminal of said holder being connectible to an electric circuit, another electrically conducting terminal that is connectible to said electric circuit and that selectively and directly engages said second terminal of said protector for electric circuits to connect said protector for said electric circuits to said electric circuit, a plurality of rating-regulating projections of predetermined size and configuration on and integral with one of the said terminals of said protectors for electric circuits, and complementary rating-regulating surfaces carried by said holder, said rating-regulating projections coacting with said rating-regulating surfaces to permit said protector for electric circuits to electrically engage said holder-carried terminal and to prevent the electrical engagement of said holder-carried terminal and the first terminal of another protector for electric circuits that is similar to said protector for electric circuits but has rating-regulating projections that differ from said rating-regulating projections of the first said protector for electric circuits, said terminals of said protectors for electric circuits being dimensioned to permit full viewing of said rating-regulating surfaces associated with said holder whenever said rating-regulating projections and said rating-regulating surfaces are in engagement.

13. In the combination of a protector for electric circuits which has a predetermined rating and a holder which accepts said protector for electric circuits and rejects protectors for electric circuits having different ratings and wherein said protector has an elongated casing, a ferrule of electrically conducting material attached to one end of said casing, and a second ferrule of electrically conducting material attached to the other end of said casing, and wherein said holder is elongated and defines an elongated recess and defines an opening at one end of the said recess, the improvement which comprises an electrically conducting terminal that is carried by said holder and is in communication with said recess and that is selectively engaged by the first said ferrule of said protector for electric circuits, said holder-carried terminal being connectible to an electric circuit, another electrically conducting terminal that is connectible to said electric circuit and that selectively engages said second ferrule of said protector for electric circuits, a rating-regulating projection of a predetermined size and configuration that projects from a portion of the surface of one of the said ferrules of said protector for electric circuits, said rating-regulating projection having a cross sectional area that is smaller than the area of said portion of said surface of said one ferrule, and a complementary rating-regulating surface associated with said holder, said rating-regulating projection coacting with said rating-regulating surface to permit said protector for electric circuits to electrically engage said holder-carried terminal and to prevent the electrical engagement of said holder-carried terminal and the first ferrule of another protector for electric circuits that is similar to the first said protector for electric circuits but has a rating-regulating projection that differs from said rating-regulating projection of the first said protector for electric circuits, said rating-regulating projection extending longitudinally of and projecting axially beyond said protector for electric circuits.

14. In the combination of a protector for electric circuits which has a predetermined rating and a holder which accepts said protector for electric circuits and rejects protectors for electric circuits having different ratings and wherein said protector has an elongated casing, a ferrule of electrically conducting material attached to one end of said casing, and a second ferrule of electrically conducting material attached to the other end of said casing, and wherein said holder is elongated and defines an elongated recess and defines an opening at one end of the said recess, the improvement which comprises an electrically conducting terminal that is carried by said holder and is in communication with said recess and that is selectively engaged by the first said ferrule of said protector for electric circuits, said holder-carried terminal being connectible to an electric circuit, another electrically conducting terminal that is connectible to said electric circuit and that selectively and directly engages said second ferrule of said protector for electric circuits, a rating-regulating projection of a predetermined size and configuration that projects from a portion of the surface of one of the said ferrules of said protector for electric circuits, said rating-regulating projection having a cross sectional area that is smaller than the area of said portion of said surface of said one ferrule, and a complementary rating-regulating surface carried by said holder, said rating-regulating projection coacting with said rating-regulating surface to permit said protector for electric circuits to electrically engage said holder-carried terminal and to prevent the electrical engagement of said holder-carried terminal and the first ferrule of another protector for electric circuits that is similar to the first said protector for electric circuits but has a rating-regulating projection that differs from said rating-regulating projection of the first said protector for electric circuits, said rating-regulating surface being on said other electrically conducting terminal and defining a notch to receive said rating-regulating projection, said rating-regulating surface being integral with said electrically-conducting terminal and being displaced inwardly from the outer face of said electrically-conducting terminal, said electrically-conducting terminal being at said one end of said recess.

15. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of the said recess, the improvement which comprises an electrically conducting terminal that is carried by said holder and is in communication with said recess and that is selectively engaged by the first said terminal of said protector for electric circuits, said holder-carried terminal being urged toward said one terminal of said protector for electric circuits and engaging said one terminal of said protector for electric circuits whenever said protector for electric circuits is in inserted position within said recess, said holder-carried terminal having a stop thereon to keep said holder-carried terminal from engaging the terminals of protectors for electric circuits that are shorter than said protector for electric circuits, said holder-carried terminal being connectible to an electric circuit and another electrically conducting terminal that is connectible to said electric circuit and that selectively engages said second terminal of said protector for electric circuits.

16. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of the said recess, the improvement which comprises an electrically conducting terminal that is carried by said holder and has a protector-engaging surface in said recess adjacent the inner end thereof, said protector-engaging surface being selectively engaged by said one terminal of said protector for electric circuits, said holder-carried terminal being connectible to an electric circuit, another electrically conducting terminal that is carried by said holder and is adjacent the outer end of said recess, said other electrically conducting terminal being connectible to said electric circuit and being selectively engaged by said second terminal of said protector for electric circuits, and a spring biasing the first said holder-carried terminal toward said outer end of said recess, said spring yielding to permit the positioning of the terminals of said protector for electric circuits in electrically conducting engagement with said holder-carried terminals but having a compressed height substantially equal to the distance between said one end of said recess and said one terminal of said protector for electric circuits whenever said terminals of said protector for electric circuits are in said electrically conducting engagement with said holder-carried terminals whereby said spring is unable to yield to permit the positioning of the terminals of longer protectors for electric circuits in electrically conducting engagement with said holder-carried terminals.

17. In the combination of a protector for electric circuits which has a predetermined rating and a holder which accepts said protector for electric circuits and rejects protectors for electric circuits having different ratings wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of said recess, the improvement which comprises an electrically conducting terminal that is carried by said holder and is in communication with said recess and that is selectively engaged by the first said terminal of said protector for electric circuits, said holder-carried terminal being connectible to an electric circuit, another electrically conducting terminal that is connectible to said electric circuit and that selectively and directly engages said second terminal of said protector for electric circuits, a rating-regulating surface of a predetermined size and configuration on said protector for electric circuits, and a complementary rating-regulating surface associated with said holder, said rating-regulating surfaces coacting to lock the first said terminal of said protector for electric circuits in electrically conducting engagement with said holder-carried terminal and to prevent the locking, in electrically conducting engagement, of said holder-carried terminal and the first terminal of another protector for electric circuits that is similar to said protector for electric circuits but has a rating-regulating surface that differs from said rating-regulating surface of the first said protector for electric circuits, said terminals of said protector for electric circuits having clip-engaging areas as great as the clip-engaging areas of standard protectors for electric circuits of the same rating, whereby said protectors for electric circuits can be mounted in standard clips as well as in said holder.

18. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder defines an elongated recess and defines an opening at one end of said recess, the improvement which comprises an electrically conducting terminal that is carried by said holder within said recess and that is selectively engaged by the first said terminal of said protector for electric circuits, said terminal of said holder being connectible to an electric circuit, a second electrically conducting terminal that is carried by said holder and is selectively connectible to said electric circuit and that selectively and directly engages said second terminal of said protector for electric circuits, a rating-regulating projection of a predetermined size and configuration on said second terminal of said protector for electric circuits, and a complementary rating-regulating notch in said second terminal of said holder, said rating-regulating projection and notch coacting to lock the said terminals of said protector for electric circuits in electrically conducting engagement with said holder-carried terminals and coacting to prevent the locking, in electrically conducting engagement, of the said holder-carried terminals and the terminals of another protector for electric circuits that is similar to said protector for electric circuits but has a rating-regulating surface that differs from said rating-regulating projection of the first said protector for electric circuits, said second holder-carried terminal being a closure for said opening at said one end of said recess.

19. In the combination of a protector for electric circuits which has a predetermined rating and a holder which accepts said protector for electric circuits and rejects protectors for electric circuits having different ratings and wherein said protector has a casing, a terminal of electrically conducting material attached to said casing and a second terminal of electrically conducting material attached to said casing, and wherein said holder defines a recess and defines an opening at one end of said recess, the improvement which comprises an electrically-conducting terminal that is carried by said holder and that has a rating-regulating surface which is integral with said holder-carried electrically-conducting terminal and which is displaced inwardly from the outer face of said electrically-conducting terminal, said holder-carried electrically-conducting terminal being at said one end of said recess, said rating-regulating surface being a plane that is cut-away in part to define a notch, said rating-regulating surface being dimensioned to accommodate a complementary rating-regulating surface on said protector for electric circuits but to reject the rating-regulating surfaces of protectors for electric circuits having different rating-regulating surfaces.

20. In the combination of a protector for electric circuits which has a predetermined rating and a holder which accepts said protector for electric circuits and rejects protectors for electric circuits having different ratings and wherein said protector has a casing, a terminal of electrically conducting material attached to said casing and a second terminal of electrically conducting material attached to said casing, and wherein said holder defines a recess and defines an opening at one end of said recess, the improvement which comprises an electrically conducting terminal that is carried by said holder and that is selectively engageable by the first said terminal on said casing, a second electrically conducting terminal that selectively and directly engages said second terminal on said casing, said second terminal on said casing having a rating-regulating projection thereon that coacts with a rating-regulating surface on said holder, said second terminal on said casing having a clip-engaging area that facilitates the mounting of said protector for electric circuits in said holder or in standard clips.

21. In the combination of a protector for electric circuits which has a predetermined rating and a holder which accepts said protector for electric circuits and rejects protectors for electric circuits having different ratings and wherein said protector has an elongated casing, a terminal of electrically conducting material attached to one end of said casing, and a second terminal of electrically conducting material attached to the other end of said casing, and wherein said holder is elongated and defines an elongated recess and defines an opening at one end of said recess, the improvement which comprises an electrically conducting terminal that is carried by said holder and is in communication with said recess and that is selectively engaged by the first said terminal of said protector for electric circuits, said holder-carried terminal being connectible to an electric circuit, another terminal of electrically conducting material that is carried by said holder and is selectively connectible to said electric circuit and that selectively engages said second terminal of said protector for electric circuits, an electrically conducting rating-regulating surface of a predetermined size and configuration on one of the said terminals of said protector for electric circuits, and a complementary electrically conducting rating-regulating surface on one of said holder-carried terminals, said rating regulating surfaces coacting to selectively conduct current between said one terminal of said protector for electric circuits and said one holder-carried terminal, said rating-regulating surfaces coacting to selectively lock said protector for electric circuits in electrically conducting engagement with said holder-carried terminals and to prevent the locking, in electrically conducting engagement, of said holder-carried terminals and another protector for electric circuits that is similar to said protector for electric circuits but has a different rating and has a rating-regulating surface that differs from said rating-regulating surface of the first said protector for electric circuits, said protectors for electric circuits being two of a number of similar protectors for electric circuits that differ in the rating-regulating surfaces thereof.

22. In the combination of a protector for electric circuits which has a predetermined rating and is dimensioned and constructed to be selectively insertable in a holder for protectors for electric circuits or in standard fuse clips and wherein said protector has a casing, a terminal of electrically conducting material that is a ferrule and is attached to said casing and a second terminal of electrically conducting material that is a ferrule and is attached to said casing, the improvement which comprises an electrically conducting projection on one of said terminals of said protector for electric circuits that projects radially outwardly beyond the periphery of said one terminal and that selectively coacts with an electrically conducting terminal of said holder to permit the holding of said protector for electric circuits in said holder, the other terminal of said protector for electric circuits being insertable in an elongated recess in said holder and being directly engageable with a second electrically conducting terminal of said holder that is adjacent the inner end of said recess, said one terminal of said protector for electric circuits extending part way into said holder to directly engage the first said electrically conducting terminal of said holder and having a portion thereof disposed externally of said holder to constitute a finger-receiving surface that can be gripped to cause movement of said protector for electric circuits relative to said holder, said terminals of said protector for electric circuits having clip-engaging areas that facilitate the mounting of said protector for electric circuits in said holder or in standard fuse clips.

23. In the combination of a protector for electric circuits which has a predetermined rating and is dimensioned and constructed to be selectively insertable in a holder for protectors for electric circuits or in standard fuse clips and wherein said protector has a casing, a terminal of electrically conducting material that is a ferrule and is attached to said casing and a second terminal of electrically conducting material that is a ferrule and is attached to said casing, the improvement which comprises an electrically conducting projection on one of said terminals of said protector for electric circuits that projects radially outwardly beyond the periphery of said one terminal and that selectively coacts with an electrically conducting terminal of said holder to permit the holding of said protector for electric circuits in said holder, the other terminal of said protector for electric circuits being insertable in an elongated recess in said holder and being directly engageable with a second electrically conducting terminal of said holder that is adjacent the inner end of said recess, said one terminal of said protector for electric circuits extending part way into said holder to directly engage the first said electrically conducting terminal of said holder and having a portion thereof disposed externally of said holder to constitute a finger-receiving surface that can be gripped to cause movement of said protector for electric circuits relative to said holder, said terminals of said protector for electric circuits having clip-engaging areas that facilitate the mounting of said protector for electric circuits in said holder or in standard fuse clips, said electrically conducting projection being an integral part of the first said terminal of said protector for electric circuits, said electrically conducting projection being disposed intermediate the ends of the first said terminal of said protector for electric circuits and being adjacent a notch at the inner end of the first said terminal of said protector for electric circuits.

24. In the combination of a protector for electric circuits which has a predetermined rating and a holder which accepts said protector for electric circuits and rejects protectors for electric circuits having different ratings and wherein said protector has a casing, a terminal of electrically conducting material attached to said casing and a second terminal of electrically conducting material attached to said casing, and wherein said holder carries two electrically conducting terminals, the improvement which comprises an electrically conducting rating-regulating surface on one of said terminals of said protector for electric circuits and a complementary electrically conducting rating-regulating surface on one of said holder-carried terminals, said rating-regulating surfaces coacting to selectively conduct current between said one terminal of said protector for electric circuits and said one holder-carried terminal, said rating-regulating surfaces coacting to selectively lock said protector for electric circuits in electrically conducting engagement with said holder-carried terminals and to prevent the locking, in electrically conducting engagement, of said holder-carried terminals and another protector for electric circuits that is similar to said protector for electric circuits but has a different rating and has a rating-regulating surface that differs from said rating-regulating surface of the first said protector for electric circuits, said protectors for electric circuits being two of a number of similar protectors for electric circuits that differ in the rating-regulating surfaces thereof.

References Cited in the file of this patent

UNITED STATES PATENTS

| | | |
|---|---|---|
| 1,863,383 | Schmidt | June 14, 1932 |
| 2,058,903 | Moore | Oct. 27, 1936 |
| 2,087,699 | Moore | July 20, 1937 |
| 2,667,547 | Lindeman | Jan. 26, 1954 |
| 2,668,215 | Duerkob | Feb. 2, 1954 |
| 2,668,885 | Gerlat | Feb. 9, 1954 |
| 2,733,314 | Schmidt | Jan. 31, 1956 |

FOREIGN PATENTS

| | | |
|---|---|---|
| 49,401 | Austria | Aug. 10, 1911 |
| 134,404 | Germany | Sept. 11, 1902 |
| 161,677 | Switzerland | July 17, 1933 |
| 250,245 | Great Britain | Nov. 11, 1926 |
| 301,062 | Great Britain | Dec. 23, 1929 |
| 371,949 | Great Britain | May 2, 1932 |